May 24, 1949.  F. BENOIT  2,470,970
ELECTRICAL APPARATUS FOR USE IN OBSTETRICS
Filed Aug. 10, 1945  5 Sheets-Sheet 1

May 24, 1949. F. BENOIT 2,470,970
ELECTRICAL APPARATUS FOR USE IN OBSTETRICS
Filed Aug. 10, 1945 5 Sheets-Sheet 2

May 24, 1949.   F. BENOIT   2,470,970
ELECTRICAL APPARATUS FOR USE IN OBSTETRICS
Filed Aug. 10, 1945   5 Sheets-Sheet 4
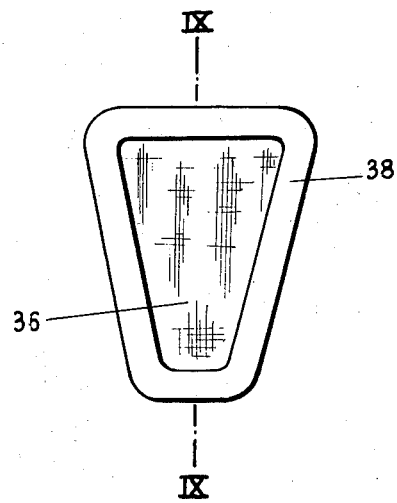
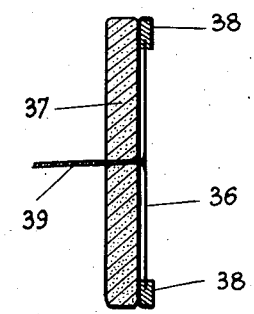
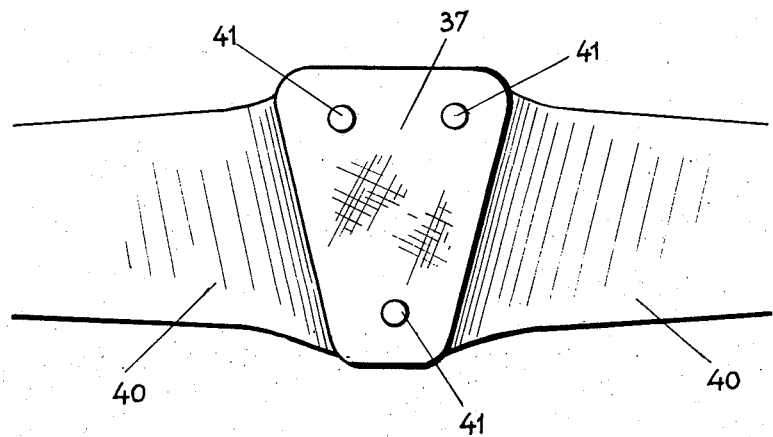

May 24, 1949.  F. BENOIT  2,470,970
ELECTRICAL APPARATUS FOR USE IN OBSTETRICS
Filed Aug. 10, 1945  5 Sheets-Sheet 5

Patented May 24, 1949

2,470,970

UNITED STATES PATENT OFFICE 2,470,970

ELECTRICAL APPARATUS FOR USE IN OBSTETRICS

Frederic Benoit, Vassy, France

Application August 10, 1945, Serial No. 610,130
In France October 12, 1943

Section 1, Public Law 690, August 8, 1946
Patent expires October 12, 1963

8 Claims. (Cl. 128—407)

My invention has for its object a machine adapted to transform the alternating current produced by a distributing network at say fifty periods into a current of low frequency and low tension which is sinusoidal and modulated as desired in amplitude; said current has a special physiological action and may thereby find a particularly interesting application in obstetrics: this forms thus a new application of electrical currents in obstetrics.

The apparatus considered is chiefly characterized by the application of two valves mounted in opposition so as not to produce any rectification of the alternating current, said valves ensuring through the calorific inertia of their filaments the obtention of exponential enveloping curves during the successive ignitions and extinctions produced during the operation, which removes consequently the drawback due to sudden variations in the electrical current.

My improved machine is moreover characterized by the association with the two abovementioned valves of an adjustable resistance mounted in shunt relationship in the circuit of the filaments and allowing the modification at will of the limit elongations of the modulation stages.

The machine comprises moreover a voltage reducing transformer the secondary of which includes the winding feeding the utilization circuit and a heating winding for each of the valves, a potentiometer serving for the adjustment of the current to be used, a device controlling the lighting and the extinctions by means of relay electromagnets operating at low voltage on a mercury switch, said arrangement ensuring the perfect operation of the apparatus in a perfectly reliable manner even in the case of a grounding of the surgical furniture; test lamps are further provided for the supervision at any moment of the state of operation of the apparatus and of the ignition of the valves.

Lastly the apparatus may comprise also a switch handle serving for the modulation of the sinusoidal current at low voltage, the machine comprising also trapezium shaped electrodes made in reinforced rubber and a speculum forming a vaginal electrode.

In appended drawings there is shown by way of example only, without any limitation in the scope of the invention, a form of execution of the apparatus.

Figure 8 is a front view of the trapezium-shaped electrode seen through its operative surface.

Figure 9 is a cross-section through IX—IX of Figure 8.

Figure 10 shows the trapezium-shaped electrode seen through its nonmetallic surface, associated with a belt or the like means for securing it to the body of the patient.

Figure 11:
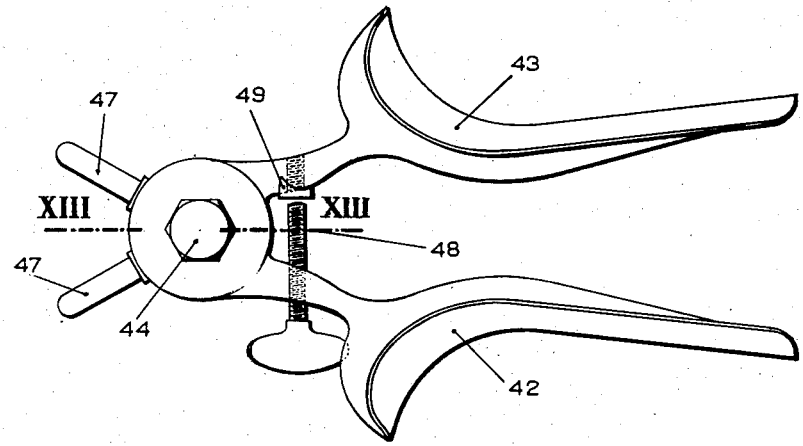
Figure 11 is an elevational view of the speculum forming a vaginal electrode.
Figure 13:
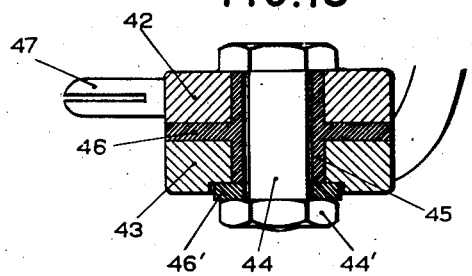

Figure 13 lastly is a cross-section at a larger scale through line XIII—XIII of Figure 11, said cross-section showing the detail of a device for the insulation of the jaws of the speculum.

The current from the mains which may be at 110 volts, 50 periods for instance is applied to the terminals 1, 2 of the primary 3 of the transformer T used for lowering the voltage. The secondary of this transformer comprises two windings 4, 5 producing the current, heating the filaments of the valves 6 and 7, and the winding 8 producing the current adapted for use and which is collected at the terminals 9 and 10 of the apparatus.

Figure 1:
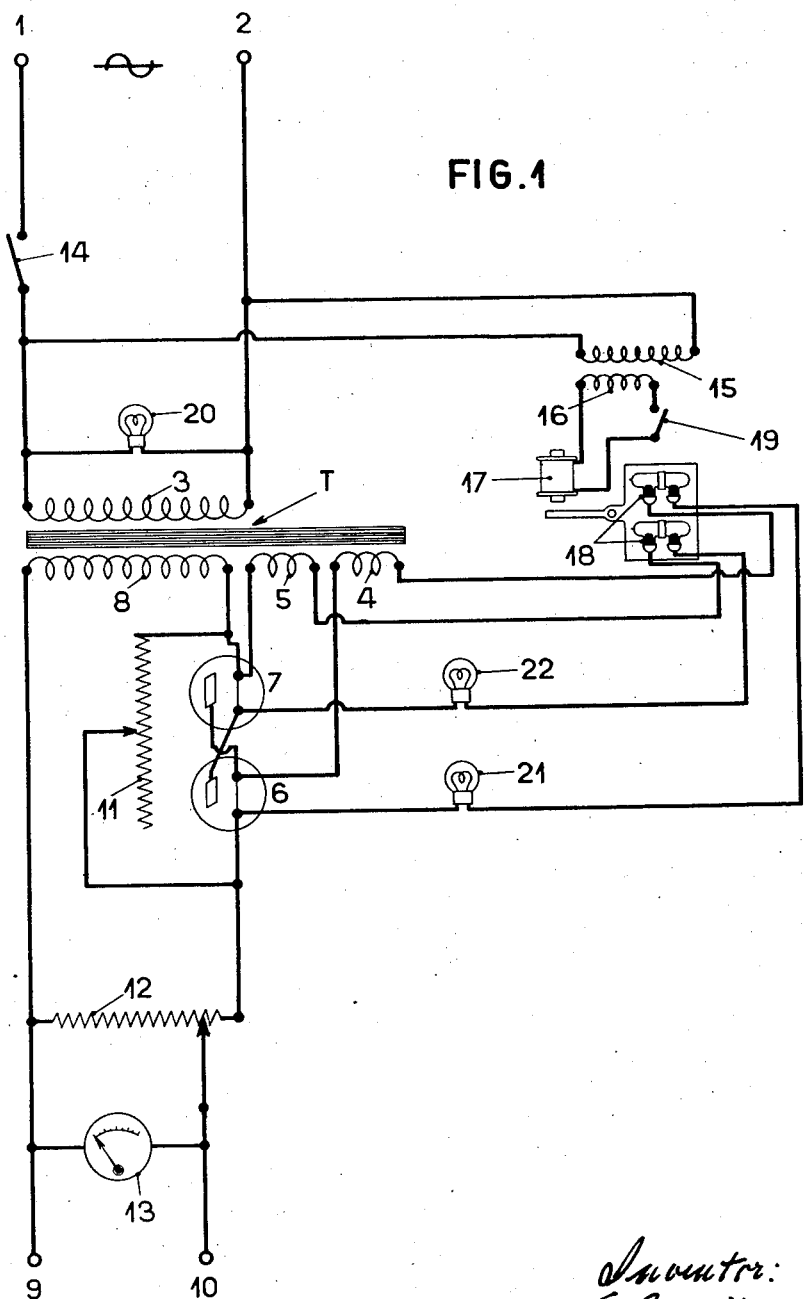
Figure 1 is a wiring diagram thereof.

In the circuit of the secondary winding 8 are arranged the two valves 6 and 7 mounted in opposition as illustrated in Fig. 1 whereby the rectifying action of the alternating current produced by each valve is cancelled by the action of the other so that it is possible to collect thus at the terminals 9—10 a purely sinusoidal current at low voltage, the value of said voltage at the terminals of the windings 8 being chosen as desired and being determined in any known manner by the secondary winding 8 of the transformer T.

An adjustable resistance 11 is mounted in shunt relationship with reference to the valve circuit. The adjustment of this resistance determines the ratio of modulation produced by the apparatus or in other words the difference between the amplitude of the current which is fed when the valves are energized and the amplitude thereof when said valves are deenergized. As a matter of fact, in the second case, the current fed by the winding 8 passes only through the adjustable resistance 11 whereas if the valves are energized, said current passes both through the resistance and through the valves mounted in parallel so that the current passes consequently through a circuit of lesser resistance.

The potentiometer 12 allows an adjustment of the current used under the control of the voltmeter 13. A general circuit breaker 14 is provided in the circuit of the primary of the transformer; it is preferably inserted in practice on the axis of the potentiometer 12.

In accordance with a chief feature of my invention, the control of the energization and deenergization of the valves which provides for a modulation of the sinusoidal current, instead of being obtained directly, is obtained through the agency of a relay designed in the following manner:

To the terminals 1 and 2 is connected the primary 15 of an auxiliary transformer, the secondary 16 of which feeds with low voltage current the winding 17 of an electromagnet; the core of the latter controls two mercury tubes formant switches and shown diagrammatically at 18, 18 in Fig. 1. In the circuit 16—17 is inserted a switch 19 which may be constituted by a pedal or a handle.

Lastly a general witness lamp is provided at 20 and other witness lamps 21—22 are mounted in series in the circuits heating the valves 6 and 7.

Figure 3:
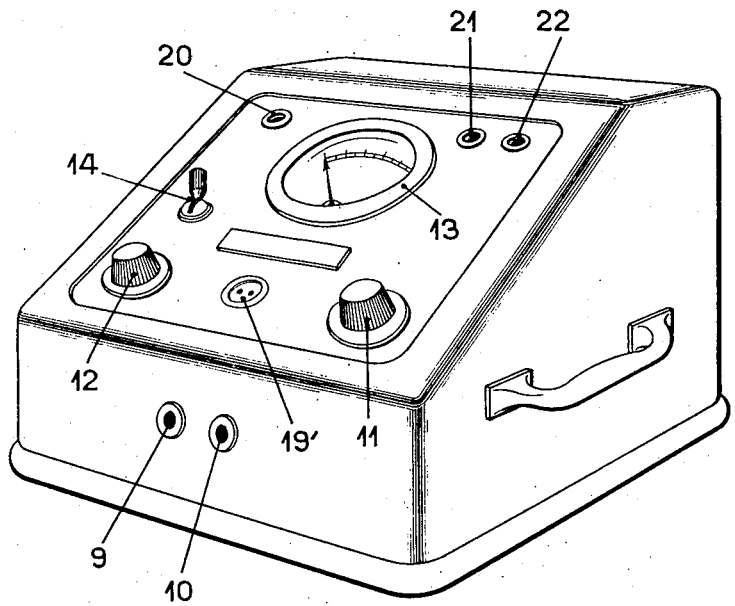
Figure 3 is an outer view of the apparatus according to a form of execution chosen solely by way of example.

In Fig. 3 I have shown the same reference numbers as in the wiring diagram of Fig. 1 for the elements of the apparatus which appear to view. In said Fig. 3, 19' designates a tapping to which is connected through the agency of a yielding connection, the switch 19 constituted by a handle, and/or a pedal.

Figure 2:
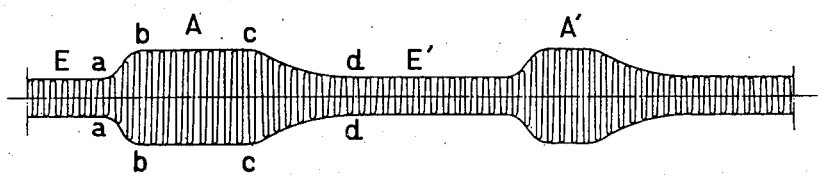
Figure 2 shows an oscillogram of the currents obtained.

The operation and form of execution of this apparatus are as follows: two wide electrodes of reinforced rubber and preferably of trapezoidal shape (Figs. 8 to 10) are connected with the terminals 9 and 10 and are applied against the points where the current is to exert its action; the apparatus is set under tension by closing the switch 14 which produces the illumination of the witness lamp 20. The current circulating in the circuit of the electrodes has the amplitude illustrated by the portion E of Fig. 2 which depends on the value given to the resistance 11; the adjustment of this resistance may be executed in each particular case at the moment at which the apparatus is to be used or else it may be executed once and for all by the builder.

When the switch 19 is closed, the electromagnet 17 is energized and draws its armature which produces the operation of the mercury switches 18—18: the latter close the heating circuit of the valves 6, 7 which are illuminated at the same time as the corresponding witness lamps 21, 22. As soon as the valves are operative, the sinusoidal current produced by the secondary 8 of the transformer 7 passes both through the valves and through the resistance 11 mounted in parallel and its amplitude reaches the value shown at A. By reason of the calorific inertia of the valve elements, the variation in amplitude is not produced suddenly but follows an exponential curve $a, b$. When the switch 19 is opened, and the heating of the valves is thus interrupted, the current returns to its preceding amplitude E' (Fig. 2) the variations in amplitude also following an exponential curve $c, d$. These variations are repeated (Fig. 2) with durations which vary at will for each phase as long as the apparatus is caused to continue its operation by opening and closing the switch 19.

The application of the valves 6, 7 produces also the advantage of doing away with the detrimental breaking extra-current by reason in particular of the calorific inertia of the filament; such an extra current would be produced at every operation if the successive opening and closing of the circuit were sudden.

During the operation of the apparatus, the witness lamps 21, 22 allow the operator to make sure at any moment that the two valves are operative. This is an essential point as if one of the valves were to cease operation, the action of the other would not be cancelled any longer and there would be collected at the terminals 9, 10 a partly rectified current the biasing action of which is all the more detrimental as the modification in the nature of the current cannot be perceived by the patient.

The mercury switches provided for the apparatus show the advantage of having contacts which are practically not subject to wear and the perfect quality of which is of particular interest for low tensions.

The switch handle serving for the production of modulations as to amplitude of the sinusoidal current of low voltage as disclosed hereinabove, comprises a tubular body of handle proper 23 closed at its end by plugs 24 and 25, the plug 25 being bored at 26 so as to afford a passage for the yielding leads.

Figure 5:
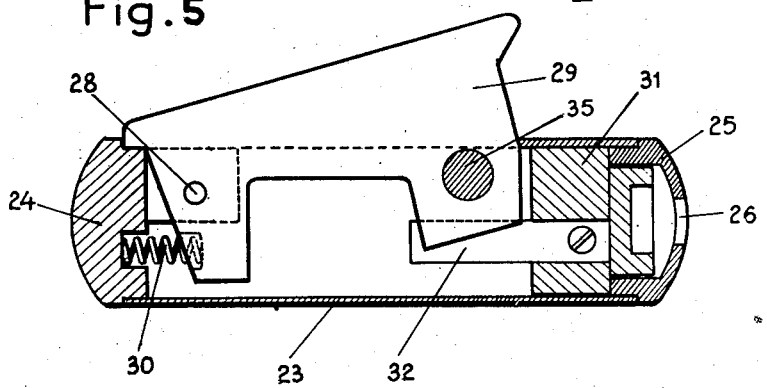
Figure 5 is a cross-section through line V—V of Figure 4.

The plug 24 is provided inside the body 23 with an extension constituted by a strap 27 inside which may pivot round a bolt 28 forming its axis, a handle or trigger 29 of insulating material and a spring 30 urges constantly the latter into its circuit interrupting or opening position illustrated in Fig. 5. As clearly apparent in Fig. 5, the trigger 29 occupies the major portion of the length of the tubular body 23; the operation thereof is of a particularly easy character as it is obtained by the physiologically natural gesture consisting in the closing of the hand over it.

To the plug 25 is secured a member 31 of insulating material showing inside the handle 23 two flat surfaces over which are secured two blades 32 of a metal which is a good conductor for electricity. The natural elasticity of these blades may be increased as shown in Fig. 4 by springs 33 bearing against said blades and urging them together.

The screws 34 by means of which the blades 32 and the spring 33 are secured to the member 31 serve also for securing the lead wires entering the arrangement through the opening 26 in the plug 25.

Figure 4:
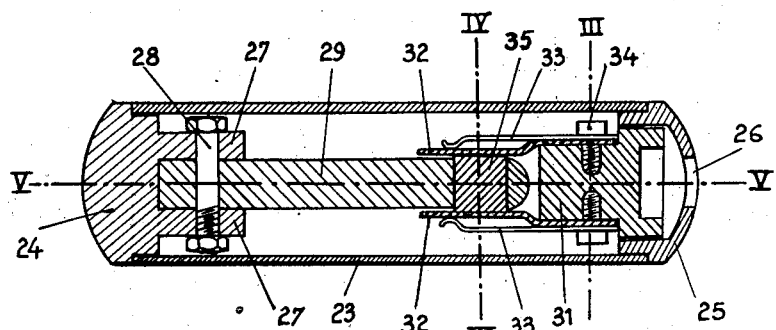
Figure 4 is a longitudinal cross-section through the axis of the switch handle.
Figures 6, 7:
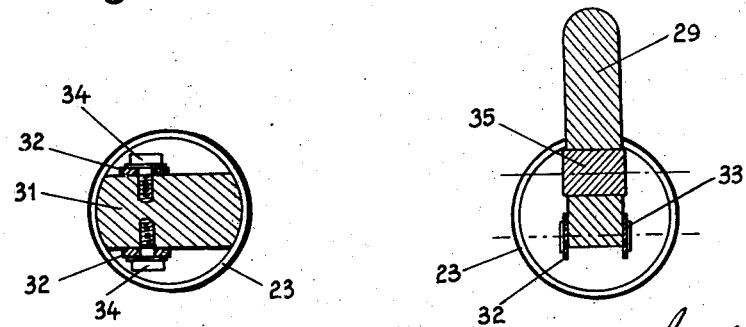
Figures 6 and 7 are respectively cross-section through lines VI—VI and VII—VII of Figure 4.

At the end of the trigger 29 opposite the end to which it is pivotally secured, said trigger carries a core 35 of a metal which is a good conductor for electricity and which projects slightly to either side of the trigger as apparent in Figs. 4 and 7. The position occupied by it is such that it engages the interval between the blades 32 when the trigger is depressed in order to enter inside the handle. For such a position of the trigger, the core 35 connects the two blades 32 which leads to a closing of the circuit. Perfect contact is ensured through the elasticity of the blade 32 completed if required by the action of the springs 33.

The arrangement thus described does away with all undesired openings and closings of the electric circuit during the period of use of the apparatus. The handle established as described may be operated without any danger by the patient herself as explained hereinabove.

The trapezoidal electrodes (Figs. 8 to 10) are constituted by a thin plate 36 of tin applied against and secured to a thick plate 37 of sponge rubber, a strip of rubber being fitted at 38 round the metal plate 36. A lead wire 39 passes through the sponge rubber and is secured to the metal plate 36. For using such electrodes, the latter are preferably associated with a belt or girt 40 made of elastic fabric. The latter is secured for instance by means of clips or press-buttons 41 to the non-metallic surface 37 of the electrode.

These electrodes show the chief following advantages:

(a) By reason of the yieldingness they may be readily applied against incurved surfaces.

(b) Their elasticity produces a constant pressure which is exerted by the active metal part.

(c) Their adherence is satisfactory in all positions.

(d) During use, the electric field is distributed in an excellent manner.

Figure 12:
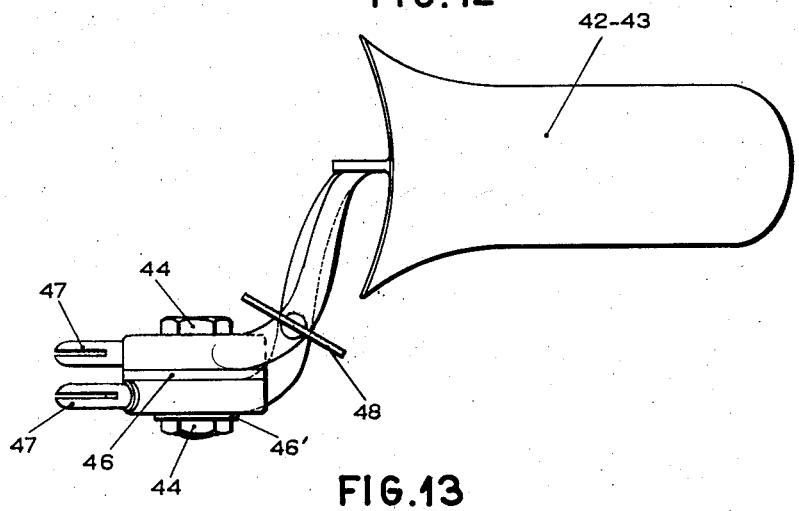
Figure 12 is a plan view thereof.

The speculum forming a vaginal electrode (Figs. 11 to 13) is constituted after the manner of an ordinary speculum with two jaws 42 and 43 pivotally secured together through a pivot 44 and adapted for the special uses for which it is intended through the application of the following means.

The pivot 44 is surrounded by a sleeve 45 made of any insulating material capable of being sterilized such as ivory; the sleeve 45 is provided at the middle of its length with a washer 46 inserted between the two jaws; the latter are thus perfectly insulated one with reference to the other. A washer 46' fastened by the nut 44' screwed over the pivot 44 completes the insulating means.

At its rear end, each jaw is provided with a pin 47 forming a current feeding plug. When the instrument is in use, one of the pins is connected with the positive terminal of the source of current while the other is connected with the negative terminal. But it is also possible, in certain cases, to connect the two pins 47 and consequently the two jaws with the same terminal of the source.

According to a further characteristic feature of my invention, the instrument includes a device for adjusting the spacing of the jaws, constituted by a screw 48 on one of the jaws and a stop 49 of ivory or the like insulating material on the other jaw.

The jaws 42 and 43 may be covered on part of surface with a coat of insulating enamel. In particular, the outer surfaces of said jaws may be left bare so that they may be electrically conductive while their inner surfaces are insulated through enamelling or through any other equivalent means.

This is the case in particular when the instrument is chiefly intended for use for obstetrical purposes: it prevents the head of the child from contacting with an electrically energized surface.

The two jaws may be electrically energized with the same polarity or with different polarities; the feeding of the instrument with different polarities for each jaw produces important advantages and in particular it allows a localizing in a predetermined zone of the electric density and the obtention of a concentration of the electric field in the useful zone in the vicinity of the contacting surfaces.

In an application of the instrument to the technics of electrical delivery, the improved speculum forming the object of my invention allows doing away the electrode adapted to be applied at a predetermined point of the patient's body.

The arrangement including the screw 48 and the stop 49 allows the adjustment at will and according to requirements of the minimum spacing between the jaws of the instrument during operation.

The improved speculum according to my invention provides also the further following advantages:

Ease of introduction;
Excellent steadiness requiring no locking;
Electrifying of the vaginal surfaces without any danger of electrising the foetal pole;
No drawback due to a hindrance in the expulsion of the foetus;
Immediate sterilization to a perfect extent;
Easy flow afforded for liquids.

Of course the details of execution described and illustrated have been given out only by way of an exemplification of the possibility of practically executing the invention and it is possible to modify in various manners the details considered or to replace some of the components of the apparatus by equivalent means without widening the scope of my invention as defined in accompanying claims.

What I claim is:

1. An apparatus for transforming an alternating current from the mains into a purely sinusoidal current at low frequency and low voltage adapted to be modulated in amplitude and forming a succession of sinusoidal waves of variable amplitude connected by damped waves having exponential enveloping curves, said apparatus comprising two valves mounted in opposition and the filaments of which have a calorific inertia which provides for the obtention of exponential enveloping curves, means for controlling the energizing and deenergizing of said valves during operation, means for feeding alternating current to the valves and means fed by the purely sinusoidal current from the valves to the point of utilization.

2. An apparatus for transforming an alternating current from the mains into a purely sinusoidal current at low frequency and low voltage adapted to be modulated in amplitude and forming a succession of sinusoidal waves of variable amplitude connected by damped waves having exponential enveloping curves, said apparatus comprising two valves mounted in opposition and the filaments of which have a calorific inertia which provides for the obtention of exponential enveloping curves, means for controlling the energizing and deenergizing of said valves during operation, a voltage reducing transformer including a primary fed by the mains and a secondary comprising an element adapted to feed current to the utilization point through the valves and two elements adapted to feed the heating filaments of the corresponding valves, an adjustable resistance inserted shuntwise with the valves in the circuit of the first element of the transformer secondary and adapted to modify the amplitude of modulation and a potentiometer inserted in the same circuit.

3. An apparatus for transforming an alternating current from the mains into a purely sinusoidal current at low frequency and low voltage adapted to be modulated in amplitude and forming a succession of sinusoidal waves of variable amplitude connected by damped waves having exponential enveloping curves, said apparatus comprising two valves mounted in opposition and the filaments of which have a calorific inertia which provides for the obtention of exponential enveloping curves, means for feeding the alternating current to the valves, a transformer fed by the mains, a low tension relay electromagnet fed by the secondary thereof, a switch controlling the energization of said electromagnet, two mercury switches controlled by the electromagnet and inserted in the corresponding valve heating circuits and adapted to provide simultaneously the energization and deenergization of the valves according to as whether the electromagnet is energized or not, and means fed by the purely sinusoidal current from the valves to the point of utilization.

4. An apparatus for transforming an alternating current from the mains into a purely sinusoidal current at low frequency and low voltage adapted to be modulated in amplitude and forming a succession of sinusoidal waves of variable amplitude connected by damped waves having exponential enveloping curves, said apparatus comprising two valves mounted in opposition and the filaments of which have a calorific inertia which provides for the obtention of exponential enveloping curves, a voltage reducing transformer including a primary fed by the mains and a secondary comprising an element adapted to feed current to the utilization point through the valves and two elements adapted to feed the heating circuits of the corresponding valves, an adjustable resistance inserted shuntwise with the valves in the circuit of the first element of the transformer secondary and adapted to modify the amplitude of modulation, a potentiometer inserted in the same circuit, a secondary transformer fed by the mains, a low tension relay electromagnet fed by the secondary thereof, a switch controlling the energization of said electromagnet and two mercury switches controlled by the electromagnet and inserted in the corresponding valve heating circuits and adapted to provide simultaneously the energization and deenergization of the valves according as to whether the electromagnet is energized or not.

5. In an apparatus as claimed in claim 1, the provision of an electrode adapted for use at the point of utilization and comprising a thin tin folio, a thick plate of sponge rubber carrying said folio, a lead wire passing through said rubber and adapted to connect the tin folio with the means feeding the current to the point of utilization and a belt of elastic fabric carrying the plate of sponge rubber, and adapted for wear by the patient.

6. An apparatus for transforming an alternating current from the mains into a purely sinusoidal current at low frequency and low voltage adapted to be modulated in amplitude and forming a succession of sinusoidal waves of variable amplitude connected by damped waves having exponential enveloping curves, said apparatus comprising two valves mounted in opposition and the filaments of which have a calorific inertia providing for the obtention of exponential enveloping curves, means for controlling the energizing and deenergizing said valves during operation, means for feeding the alternating current to the valves, a speculum forming electrode constituted by two jaws pivotally secured to one another and removable means for feeding the purely sinusoidal current fed by the valves to said electrode.

7. The combination of a speculum forming electrode constituted by two jaws pivotally secured to one another, each of said jaws being electrically insulated only on the faces opposing one another and removable means adapted to connect said jaws with a source of purely sinusoidal current.

8. The combination of a speculum forming electrode constituted by two jaws pivotally secured to one another, each of said jaws being electrically insulated only on the faces opposing one another, an adjustable insulated stop carried by one jaw for adjusting the spacing between said jaws and removable means adapted to connect said jaws with a source of purely sinusoidal current.

FREDERIC BENOIT.

REFERENCES CITED

The following references are of record in the file of this patent:

UNITED STATES PATENTS

| Number | Name | Date |
|---|---|---|
| 666,956 | Dickerson | Jan. 29, 1901 |
| 1,720,662 | Burke | July 16, 1929 |
| 1,994,907 | Dawson | Mar. 19, 1935 |
| 2,028,338 | Le Bel | Jan. 21, 1936 |
| 2,046,712 | Washburn | July 7, 1936 |
| 2,065,295 | Sullivan | Dec. 22, 1936 |
| 2,071,860 | Stoddard | Feb. 23, 1937 |
| 2,073,701 | Lazzarini | Mar. 16, 1937 |
| 2,201,966 | Dawson | May 21, 1940 |
| 2,363,305 | Faulk | Nov. 21, 1944 |

FOREIGN PATENTS

| Number | Country | Date |
|---|---|---|
| 487,385 | Germany | Dec. 14, 1929 |
| 583,414 | Germany | Sept. 2, 1933 |